(12) United States Patent
Hsu et al.

(10) Patent No.: US 7,465,091 B2
(45) Date of Patent: Dec. 16, 2008

(54) LINEAR GUIDE DEVICE

(75) Inventors: Ming-Che Hsu, Tainan Hsien (TW); Lih-Fen Chen, Tainan Hsien (TW)

(73) Assignee: Chiefiech Precision Co., Ltd., Sinshih Hsiang, Southern Taiwan (TW)

( * ) Notice: Subject to any disclaimer, the term of this patent is extended or adjusted under 35 U.S.C. 154(b) by 331 days.

(21) Appl. No.: 11/378,586

(22) Filed: Mar. 20, 2006

(65) Prior Publication Data
US 2007/0140602 A1    Jun. 21, 2007

(30) Foreign Application Priority Data
Dec. 20, 2005   (TW) ............... 94145687 A

(51) Int. Cl.
*F16C 33/66* (2006.01)
*F16C 29/06* (2006.01)
(52) U.S. Cl. ............ 384/13; 384/15; 384/462
(58) Field of Classification Search ............ 384/13–15, 384/43–45, 322, 413, 462, 902
See application file for complete search history.

(56) References Cited

U.S. PATENT DOCUMENTS

| 2,539,769 | A | * | 1/1951 | Berthiez | 384/15 |
|---|---|---|---|---|---|
| 2,620,238 | A | * | 12/1952 | Berthiez | 384/15 |
| 3,311,502 | A | | 3/1967 | Carson | |
| 5,399,023 | A | * | 3/1995 | Winkelmann et al. | 384/13 |
| 5,466,543 | A | | 11/1995 | Ikoma et al. | |
| 5,570,958 | A | * | 11/1996 | Tsukada | 384/45 |
| 5,694,811 | A | * | 12/1997 | Tsukada | 384/13 |
| 5,773,169 | A | | 6/1998 | Matsuda et al. | |
| 5,993,064 | A | * | 11/1999 | Teramachi et al. | 384/43 |
| 6,150,054 | A | | 11/2000 | Ovshinsky et al. | |
| 6,170,986 | B1 | * | 1/2001 | Hsu et al. | 384/15 |
| 6,250,805 | B1 | * | 6/2001 | Kuwahara | 384/15 |
| 6,287,726 | B1 | | 9/2001 | Ohta et al. | |
| 6,338,917 | B1 | | 1/2002 | Maeda et al. | |
| 6,489,059 | B2 | | 12/2002 | Suzuki et al. | |
| 6,712,511 | B2 | * | 3/2004 | Matsui et al. | 384/45 |
| 7,066,648 | B2 | * | 6/2006 | Edelmann et al. | 384/13 |
| 7,306,373 | B2 | * | 12/2007 | Yamazaki et al. | 384/45 |
| 2006/0023978 | A1 | * | 2/2006 | Haub | 384/13 |

FOREIGN PATENT DOCUMENTS

| JP | 10078032 A | * | 3/1998 |
| JP | 10078033 A | * | 3/1998 |
| JP | 2000035040 A | * | 2/2000 |
| JP | 2004211906 A | * | 7/2004 |

* cited by examiner

*Primary Examiner*—Marcus Charles

(57) ABSTRACT

A linear guide device comprises a rail, at least a slide member and multiple rows of rolling elements. The slide member comprises a rigid body; a bottom frame; a pair of end caps and a pair of reinforce plates. The rail and rigid body provide multiple rows of raceways opposed for the rolling elements. The bottom frame contains a plurality of lubricant reservoirs with lubrication pads inside and directly outstretch from the openings of said lubricant reservoirs to contact with the rolling elements in the raceway zone to supply lubricant on the rolling elements continuously. There are passages or tubes, having lubricating string inside, connecting the extending lubricant reservoirs. Two reinforce plates, each having two extending plates folded and stretched to the bottom of the two leg portions of the rigid body, and are attached on two end caps.

14 Claims, 6 Drawing Sheets

LINEAR GUIDE DEVICE

FIELD OF THE INVENTION

The present invention relates to linear guide devices, and more particularly to a linear guide device comprises a longitudinally extended rail, a slide member and a plurality of rows of rolling elements and a lubrication system, therewith the rolling elements roll between the raceway of the slide member and the rail and circulate in the recirculation channel provided by the slide member; a lubrication system provides the lubricant continuously for the required lubrication of rolling elements rolling on the raceways. To enhance the moving speed of the slide member along the rail, a reinforcement design of the outwards surface of the turnaround channel on the end cap is provided.

BACKGROUND OF THE INVENTION

A linear guide device comprises a rail, at least a slide member and multiple rows of rolling elements. The rail has multiple of axially extended raceways on its outer surface. The slide member is at least composed of a rigid body, a front and a rear end cap. The rigid body has a flat plate portion and two leg portions; on their inward surface there are multiple rows of raceways corresponding to the raceways on the rail one-to-one. The slide member further provides return channels aligning beside each raceway and turnaround channels for connecting the raceway and the return channel at the front and the rear end; whereby recirculation passages for the rolling elements are formed. The out wall of the turnaround channels is formed by the front and rear end caps. The slide member rides on the rail, having its unlimited sliding movement facilitated by the rolling elements rolling between the raceways of the rail and the slide member and circulating in the recirculation passage.

To prevent the wear of the rolling elements while rolling on the raceway, a permanent and sufficient lubrication on the contact surface between the rolling element and the raceway is required, there has been known a linear guide device as disclosed by U.S. Pat. No. 6,155,717, linear movement device and lubricant supplying device used therefor. Such a lubricant supplying member, mounted on the front side or the rear side of a slide member, comprises a lubricant coater brought into contact with the rail for coating the lubricant on the rail, a lubricant absorber installed contiguous to the lubricant coater for supplying the lubricant to the lubricant coater while absorbing the lubricant and holding the lubricant and lubricant amount controlling means for controlling an amount of the lubricant supplied from the lubricant absorber to the lubricant coater. However, according to this lubricant supplying system the lubricant supplying member applies lubricant to the rail outside the slide member, the slide member has to go over a distance longer than its length so that all the rolling elements can be lubricated. Therefore, the stroke of the slide member cannot be too short one side and the slide member becomes therefore longer than as normal the other side.

The lubricant supplying member may have a passage for further connection to another lubricant reservoir or an external lubricant reservoir through an lubricant inlet to enhance the lubricant reserving capability. To achieve the automatic lubricant supply ability the capillary phenomenon is applied to transport the lubricant, using materials like fibers, polymers, fur, . . . etc. The publication U.S. Pat. No. 6,125,968, lubricating oil supply system for a rolling guide apparatus, has disclosed an lubricant supply system, which comprises a supply member having a casing and a lubricating oil holding element impregnating the lubricating oil, fixed to the slide member and applying the lubricating oil with respect to the rolling surface of the rolling element or the rail together with a motion of the slide member, a reservoir tank including an element for occluding the lubricating oil disposed within the reservoir tank and mounted to the movable element, and a supply tube having a fiber entangling element therewithin and introducing the lubricating oil within the reservoir tank to the supply member, said fiber entangling element being in direct contact with both the lubricating oil holding element and the element for occluding the lubricating oil and thereby conducting the lubricating oil between the reservoir tank and the supply member. However, according to the lubricating oil supply system, when the tube is relative long and the hole is small, the entangled fiber is hard to be filled into the tube; also when the supply member, locating inside the slide member, has an anfractuous channel for connecting the lubricant tank; the entangled fiber is also hard to be filled into the channel.

On the other hand, the end caps providing the outer wall of the turnaround channels are normally made of injection-formed plastic objects and fixed by screws on both end surfaces of the rigid body of the slide member. The end cap has a hollow shape largish than the cross-section shape of the rail for the pass-through of the rail. The outer wall of the turnaround channels is thereby cut by the hollow shape and become thinner in the connection region between the raceway and the turnaround channel; the outer walls of said connection region becomes the weakest place. Limited by the space of the linear guide, the lowest recirculation channel always locates near the bottom of the slider member. The locations of the screws for fixing the end cap on the rigid body can only away from said connecting region between the raceway and the turnaround channels and beyond the lowest recirculation channel. The moving speed of the slide member on the rail increases, the direction-change impact from the rolling elements received by the turnaround channel increases too. A bending stress is generated between the impact acting point and the screw-fixing point; such bending stress facilitates the damage of the outer wall of the turnaround channel. Said connection region and the bottom side of the end cap are thereby facilitated to open and away from their position; such will cause an unsmooth recirculation of the rolling elements. Conventional seal plate design mounted on the outside of the end cap is fixed on the end cap only and can not improve the strength of the connection between the end cap and the rigid body.

SUMMARY OF THE INVENTION

The primary objective of the present invention is to provide a linear guide device wherein a slide member of which is equipped with a lubricant supply device is capable of lubricating the rolling elements running in the loading zone directly, without increasing the length of the slide member. Thereby, the slide member will lubricate all the rolling elements in a short stroke. The lubricant supply device has a passage connecting to other extending lubricant reservoirs or to the inlet of the lubricant where a tube can be connected and extended to another lubricating reservoir apart from the slide member; a lubricant supply string is provided within and easily filled into the passage or the tube, whereby the lubricant can be transported automatically from the lubricant reservoir to the lubricant supply member; the lubricant reserve ability of the lubricant supply member is therefore increased. The present invention further provides components to enhance the strength of the outer wall of the turnaround channels on the end cap of the slide member.

To achieve the above objective, a linear guide device of the present invention comprises a slide member, a rail and a multiple rows of rolling elements. The slide member consists of a rigid body, a bottom frame, a front and a rear end caps. The rigid body further comprises a flat plate and two leg portions extended downward therefrom; there are at least two raceways on the inward surface of each leg portion. The rigid body provides partial or all of the return channels beside and anear parallel to the raceways. The bottom frame, associated under the rigid body, comprises two end plates that are respectively attached to both longitudinal ends of the rigid body, a upper plate located between the two leg portions and under the flat plate of the rigid body and two under plates located under each of the leg portions; the rest of the return channels are provided therefrom. On both ends of each raceway and its corresponding return channel there are turnaround channels connecting them to form a recirculation passage, and the multiple rows of rolling elements circulate withinsides. The turnaround channel comprises an inner wall, arranged on the endplate of the bottom frame, and an outer wall, provided by the end cap. The two end caps are mounted on the outer ends of the two endplates of said bottom frame. The bottom frame further provides retain bars, situated inside the inward surface of the leg portions of said rigid body and between two adjacent rows of rolling elements; together with the retain portions from the fringe of the upper plate and two under plates of said bottom frame a multiple strips of gap parallel to the raceway are formed. The gap is a little small than the size of the rolling elements, so that the rolling elements can not only be retained in the slide member but also contact the raceway of the rail through passing the gap. A rail has multiple rows of longitudinally extended raceways, which correspond to the raceways of the slide member one-to-one, when the slide member rides on the rail. The rolling elements roll within the coupled raceways and circulate within said recirculation passage; therefore the slide member can slide on the rail infinitively long.

Each of the upper and the two under plates of the bottom frame further provides at least a concavity, which will be obturated when the bottom frame is associated under the rigid body; therewith a multiple of lubricant reservoirs are formed. The lubricant reservoir has at least one opening extending to the raceway. Lubrication pads are filled inside of said lubricant reservoirs and extend to the raceway zone through their opening and thereof are brought into contact with the rolling elements. Lubrication pads are impregnated with lubricant and supply the lubricant to the rolling elements. It is preferable that the lubrication pads made of oil-contained resin, polyurethane, sponge or felt. The lubricant reservoirs further comprise a passage to connect another extending lubricant reservoir or the lubricant inlet, where a lubricant supply tube, connecting another extending lubricant reservoir apart from the slide member, is associated. Within the passage or the supply tube situated a lubricant supply string, such is brought into contact with the lubrication pad and the lubricant inside the extending lubricant reservoir. The lubricant supply string comprises a plastic flexible string, preferably made of metallic material, and a lubricant-transporting portion, preferably made of fiber, felt, flock or floss, attached on said string and possessing the capillary capability. The lubricant is thereof can be supplied from one end to the other end of the passage or supply tube automatically. The attachment of the lubricant-transporting portion on said string can be accomplished by electrostatic adhesion or enwinding method. The lubricant supply string having its plastic flexibility befit the anfractuosities of the passage and also its strength facilitates its passing through from one end to the other end of the supply tube, which has thereof enough strength to be fixed as bended.

The linear guide device further comprises two reinforce plates attached on two end caps. On the bottom of the reinforce plates there are two extending plates folded and stretched to the bottom of the two leg portions of the rigid body. Fixing screws are applied longitudinally passing through the end caps and fix the reinforce plates on the both ends of the rigid body, and upwardly and fix the folded extending plate on the leg portions of the rigid body respectively. The end caps are thereof tightly fixed in between. The outer wall of the turnaround channel on the end cap is tightly unfolded and fixed by the reinforce plate, so that the impact from the rolling elements on the outer wall of the turnaround channel is transferred directly to the reinforce plate and passed through the fixing screws back to the rigid body. The end caps receive no bending stress and no displacement of the end caps appears any more. The end caps can endure therefore higher impact or higher rolling speed of the rolling elements. To remain the total length of the slide member, the sites of the reinforce plate for receiving the fixing screws are depressed.

The various objects and advantages of the present invention will be more readily understood from the following detailed description when read in conjunction with the appended drawings.

DETAILED DESCRIPTION OF THE PREFERRED EMBODIMENTS

Figure 1:
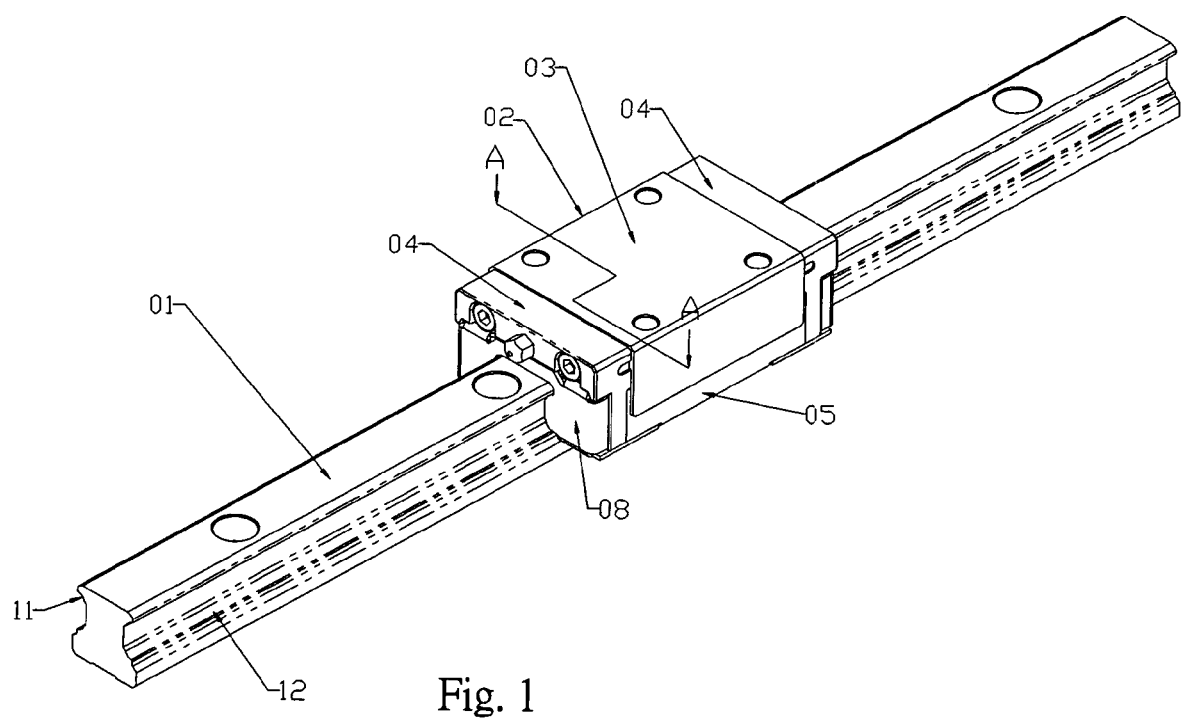
FIG. 1 is a perspective view of a linear guide device as disclosed by the present invention.
Figure 2:
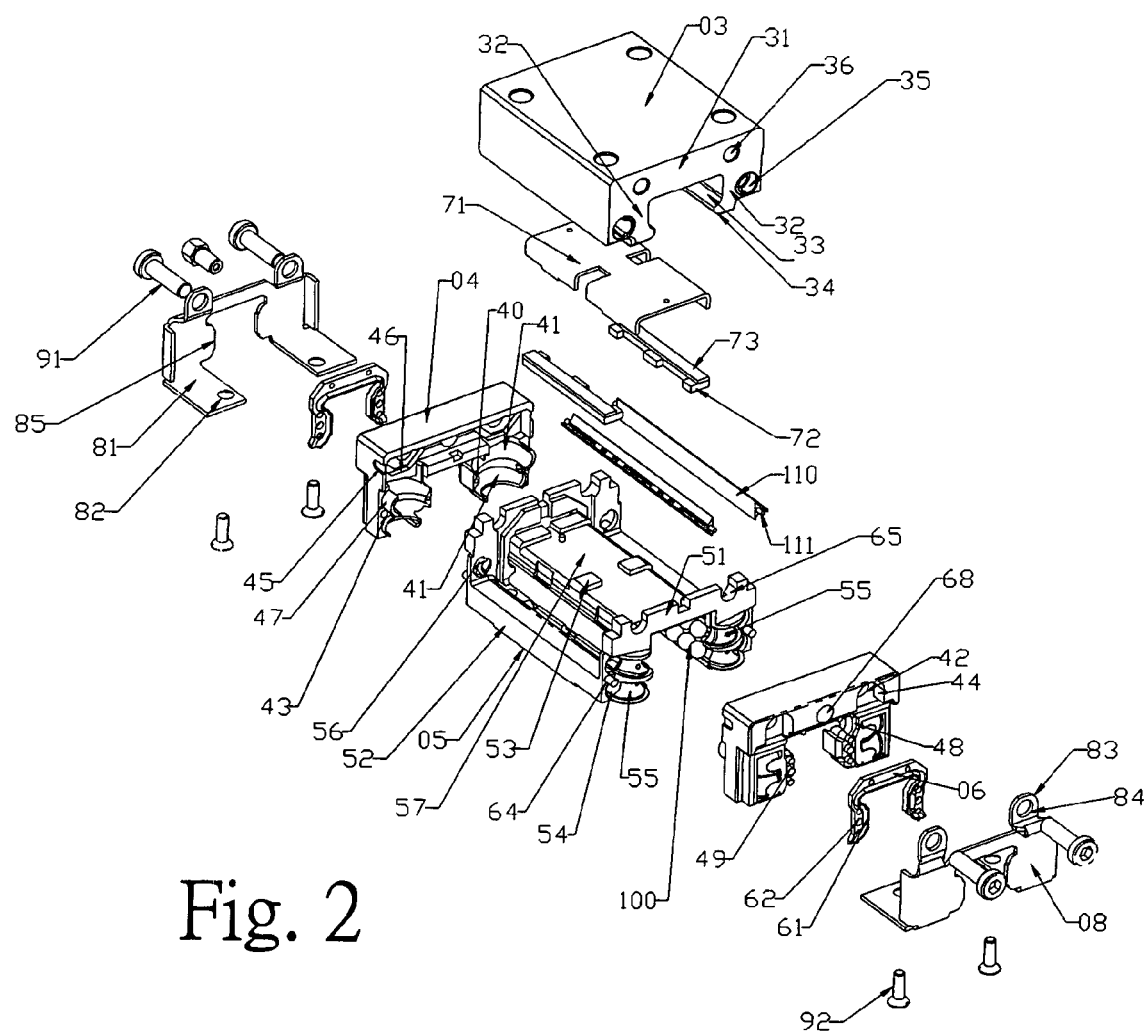
FIG. 2 is an exploded perspective view of the linear guide device in FIG. 1.

Referring to FIG. 1, a linear guide device according to the present invention comprises a rail 01, a slide member 02 and a multiple rows of rolling elements 100. The slide member 02 consists of a rigid body 03, a bottom frame 05, a front and a rear end caps 04, a front and a rear end seals 06, a front and a rear reinforce plates 08 and fixing screws 91, 92 as shown in FIG. 2. The rigid body 03 further comprises a flat plate 31 and two leg portions 32 extended downwards therefrom, there are two raceways 33, 34 on the inward surface of each leg portion. The rigid body further comprises through holes, exposed on outer sides of and anear parallel to each upper raceways 33, as return channel 35 for opposed upper raceways 33. There are screw holes 36 on both ends of the rigid body 03 and screw holes 72 on the bottom of the leg portions 32 (shown in FIG. 4).

The bottom frame 05 is associated under the rigid body 03 and comprises two end plates 51 that are respectively attached on both end sides of the rigid body 03, an upper plate 53 disposed between the two leg portions 32 and adjacent to the bottom surface of the flat plate 31 and two under plates 52 disposed adjacent to the bottom of the two leg portions 31. Therewith the upper and under plates 53, 52 are connected with the endplates 51 in one piece and formed preferable by injection molding. Each of two under plates 52 comprises a through hole, exposed on outer sides of and anear parallel to each lower raceway 34, as return channel 54 for opposed lower raceways 34.

The endplates 51 comprise a convex half-roundness 55, for each return channel 35, 54; its concave outer surface is either stretched from inside surface of each lower return channel 34 or from inside surface of the hole 56 on the endplate 51, which collimates to the upper return channel 35. Said convex half-roundness 55 has its concave outer surface on the other end collimating to the opposed raceway 33, 34.

A front and a rear end caps 04 comprise a concave half-roundness 41 for each return channel 35, 54 and opposed raceway 33, 34, a pair of projections 47 stretched from the concave half-roundness 41 for upper return channel 34 and a pair of positioning holes 43.

Each of the endplates 51 further comprises a pair of positioning pins 64. The end caps 04 are mounted longitudinally on the outer surface of the endplates 51 and through the association of the positioning pins 64 and the positioning holes 43 of the bottom frame 05, the end caps 04 are accordingly collimated, whereby a multiple of turnaround channels, incorporated by the convex half-roundness 55 as inner wall and the concave half-roundness 41 as outer wall, are formed. The turnaround channels connect the ends of the return channel and the opposed raceway on the front and rear ends and form a recirculation passage for the circulation of the rolling elements withinsides. In the meanwhile the pair of projections 47 and the upper return channels 35 are engaged and the rigid body 03 will be collimated to the end caps 04 and the bottom frame 05 altogether.

A rail 03 comprises multiple rows of longitudinally extended raceways 11, 12, which correspond to the raceways 33, 34 of the slide member one-to-one, when the slide member 02 rides on the rail 01. The multiple rows of rolling elements 100 roll within the coupled raceways 11 and 33, 12 and 34 and circulate within said recirculation passage; therefore the slide member 02 can slide on the rail 01 having no limit as shown in FIG. 1.

As shown in FIG. 2 two end seals 06 have the positioning holes 62 engaged with the locating pin 49 on the end caps 04, and therefore are situated on the recess 48 of the end surface of the end caps 04; where by the seal with double lips 61 are brought into contact with the surface of the rail 01 and arrest the dirt from outside, also keep the lubricant remaining inside the slide member 03.

Two reinforce plates 08, preferably made of metal, attach on the outer end of the end caps 04. On the bottom of the reinforce plates there are two extending plates 81 folded and stretched to attach on the bottom of the two legs 32 of the rigid body 03. Fixing screws 91 are applied longitudinally, passing through the holes 84 of the reinforce plates 08, the holes 42 of the end caps 04 and the indentation 65 of the endplates 51 of the bottom frame 05 to associate with the screw hole 36 on the rigid body 03 and fix them on both ends of the rigid body 03. Therewith fixing screws 92 are applied upwardly passing through the hole 82 of the folded extending plate 81, the hole 66 of the under plates 52 of the bottom frame 05 (shown in FIG. 3) to associate with the screw holes 37 (shown in FIG. 4) on the bottom of the legs 32 and fix them all on the bottom of the rigid body 03. The end caps 04 and the bottom frame 05 are thereof tightly fixed between the reinforce plates 08 and the rigid body 03, accordingly the multiple of concave half-roundness as outer walls 41 of the turnaround channels are tightly unfolded and fixed by the reinforce plate 08. The impact, caused by the rolling elements rolling out from the raceways and into the turnaround channel, acts on the outer wall 41 is transferred directly to the reinforce plate 08, passing over the fixing screw 91, 92 and turn back to the rigid body 03. Accordingly the end caps 04 receive no bending stress and no displacement or deformation of the end caps 04 appears any more. The end caps 04 can endure therefore higher impact or higher rolling speed of the rolling elements. To remain the total length of the slide member, the sites of the reinforce plate 08 and the end caps 04 for receiving the fixing screw 91 have recesses 83, 44 respectively.

The reinforce plates 08 have a similar shape of opening 85 as the cross-section of the rail 03 to keep a slight gap with the rail 03 and act as non-contact seal to prevent the invasion of the particles, when the slide member 02 slides on the rail 03.

The slide member 02 further comprises two retain bars 110, having fixing pin 111 on both ends and associated with the fixing hole 40 on the end caps 04 and situating inside the inward surface of the two legs 32 and each between two adjacent rows of rolling elements 100. Together with the retain portions 56 from the fringe of the upper plate 53 and under plates 52 of the bottom frame 05 a multiple strips of gap parallel to the raceways 33, 34 are formed. The gap is a little smaller than the size of the rolling elements 100 so that the rolling elements 100 are not only be retained inside the slide member but also contact the raceways 11, 12 of the rail by passing through the gap.

Figure 3:
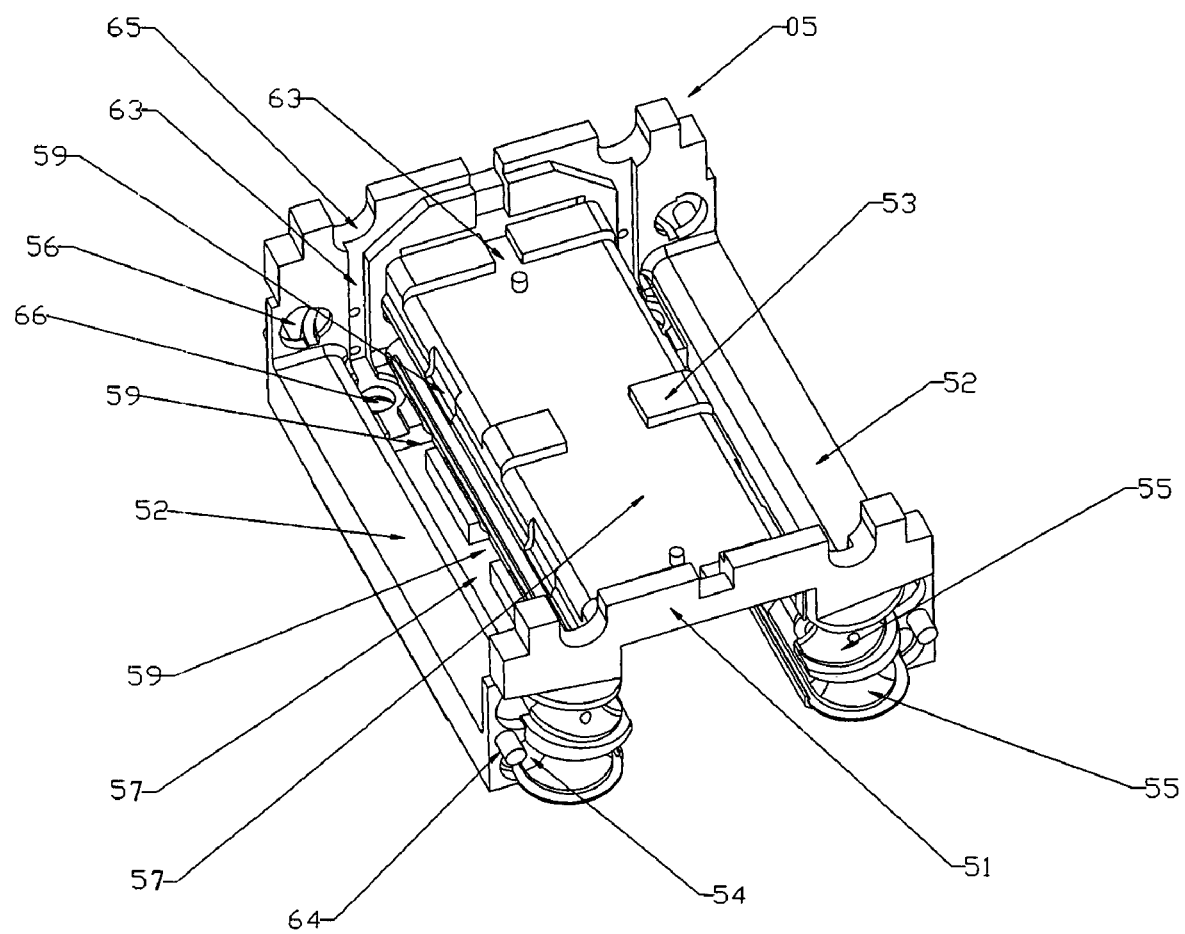
FIG. 3 is a perspective view of the bottom frame unit of the linear guide device of the present invention.
Figure 4:
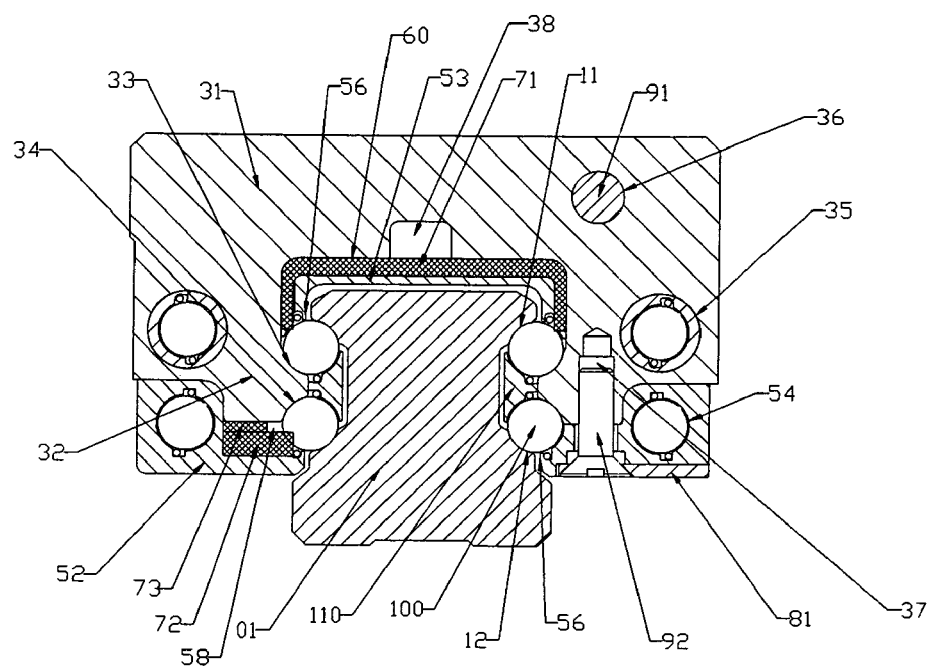
FIG. 4 is the A-A cross-sectional view of the linear guide device in FIG. 1.
Figure 5:
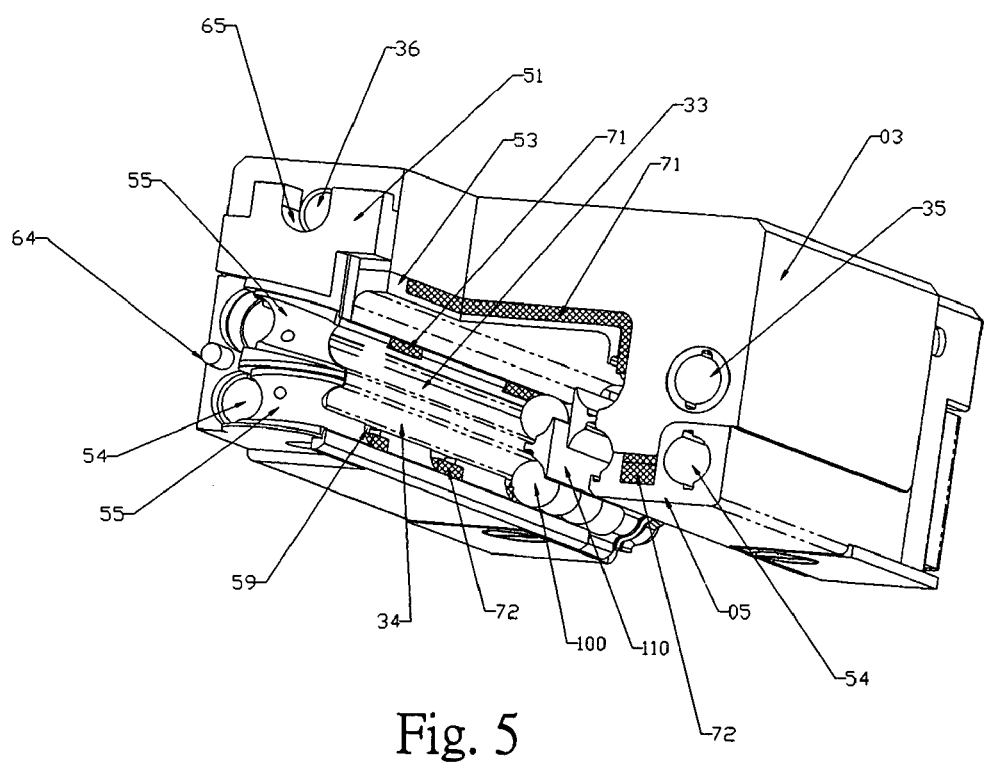
FIG. 5 is a perspective cross-sectional view of the slide member of the linear guide device, comprising the rigid body, the bottom frame, the lubricating system and the rolling elements, of the present invention.

As shown in FIGS. 3 and 4 there are concavities 57 on the upper plate 53 and under plates 52. When the Bottom frame 05 is mounted under the rigid body 03 said concavities 57 are obturated; therewith a multiple of lubricant reservoirs 58, 60 for each row of rolling elements are formed. To increase the lubricant reserving ability a recess 38 on the inward of the flat plate is provided. The lubricant reservoirs 58, 60 have multiple of openings 59 extending to the raceways. A multiple of lubrication pads 71, 72, 73 are filled inside the reservoir 60 and extend to the raceway zone through the openings 59 of the reservoirs 58, 60 and thereof are brought into contact with the rolling elements. Lubrication pads 71, 72, 73 are impregnated with lubricant and supply the lubricant direct on the adjacent rolling elements 100 as shown in FIG. 5 and bring the lubricant direct on the rolling elements whenever; accordingly the rolling elements 100 are fully lubricated in a short stroke of the slide member 02. It is preferable that the lubrication pads 71, 72, 73 are made of oil-contained resin, polyurethane, or felt.

Figure 6:
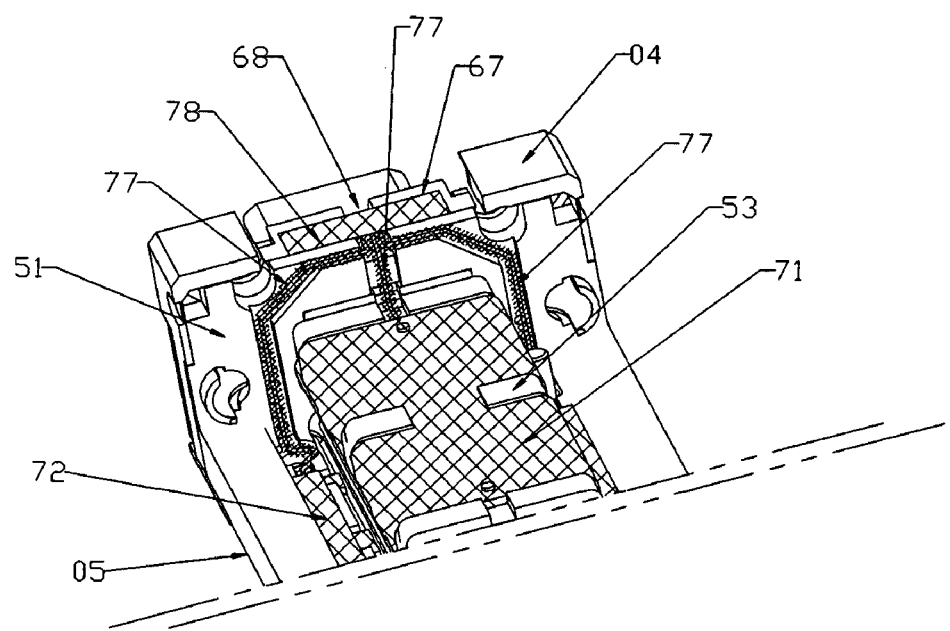
FIG. 6 is a perspective cross-sectional view of the sliding unit of the linear guide device, showing lubricant supply passage therein, of the present invention.

As shown in FIG. 3 the lubricant reservoirs 58, 60 further comprise a passage 63 between the endplate 51 and the rigid body 03, also between the upper plate 53 and the rigid body 03 to connect another extending lubricant reservoir 67 or the lubricant inlet 68 as shown in FIG. 6.

In the lubrication passage 63 there is a lubrication supply string 77 situated, which is brought into contact with the lubrication pads 71, 72, 78 in the lubricant reservoir 58, 60 an the extending lubricant reservoir 67 or the inlet 68 of the slide member 02.

Figure 7:
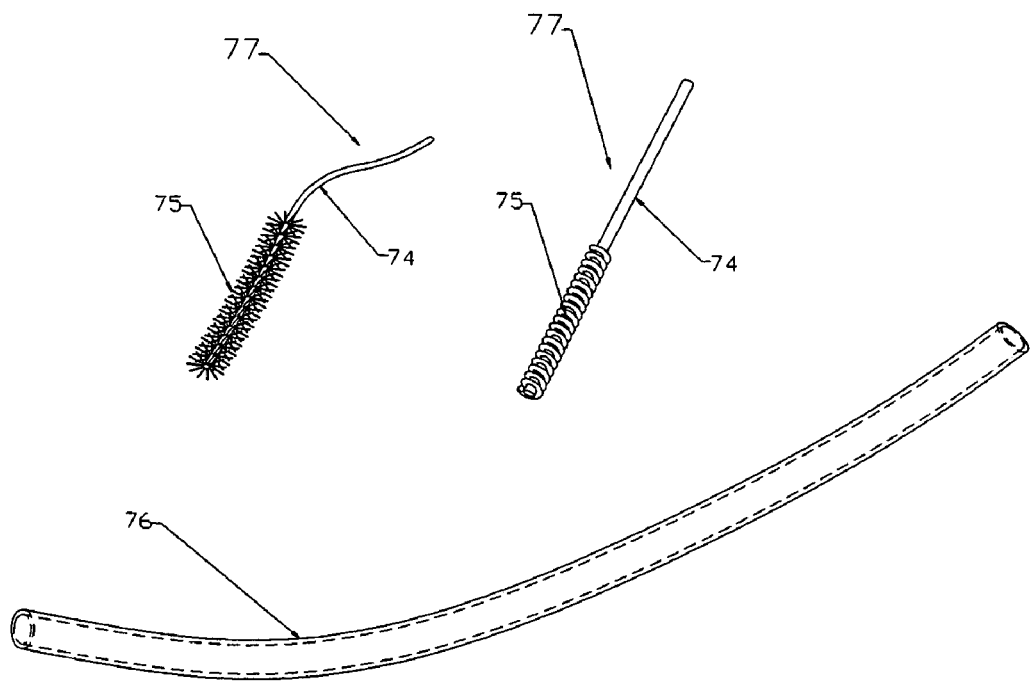
FIG. 7 shows the lubricant supply strips used in a lubricant supply tube.

As shown in FIG. 7 the lubrication supply string 77 comprises a plastic flexible string 74, preferably made of metal, and a lubricant-transporting portion 75, preferably made of fiber, felt, flock or floss, attached on said string 74 which possesses the capillary capability. The lubricant is there of can be supplied from one end to the other end of said string 77 automatically. The attachment of the lubricant-transporting portion 75 on the plastic flexible string 74 can be accomplished by electrostatic adhesion or enwinding method. Wherein the electrostatic adhesion method is performed by coating a layer of adhesive on the plastic flexible string 74, the adhesive and the lubricant-transporting portion 75 are electrostatic charged with different poles; the lubricant-transporting portion 75 will be attracted and perpendicularly attached on said plastic flexible string 74; after the adhesive is dehydrated the lubricant transporting portion 75 will be fixed perpendicularly on said plastic flexible string 74. The lubricant supply string 77 having its plastic flexibility can be easily situated inside the anfractuosities passage and, also adding its strength, facilitates its passing through the supply tube 76 from one end to the other end, which can connects another extending lubricant reservoir apart from the slide member and the inlet 68 of the slide member 02.

There are lubricant side inlets 45 on the end caps 04, wherefrom a passage 46 situated between the endplate 51 of the bottom frame 05 and the end cap 04 connects with the channel 63 extending from the front inlet 68. Said lubricant side inlets 45 are closed by a thin sheet; by penetrating the thin sheet the lubricant injector can reach the passage 46 and supply the lubricant into the lubricating passage 63 and to all lubricant reservoirs.

Figure 8:
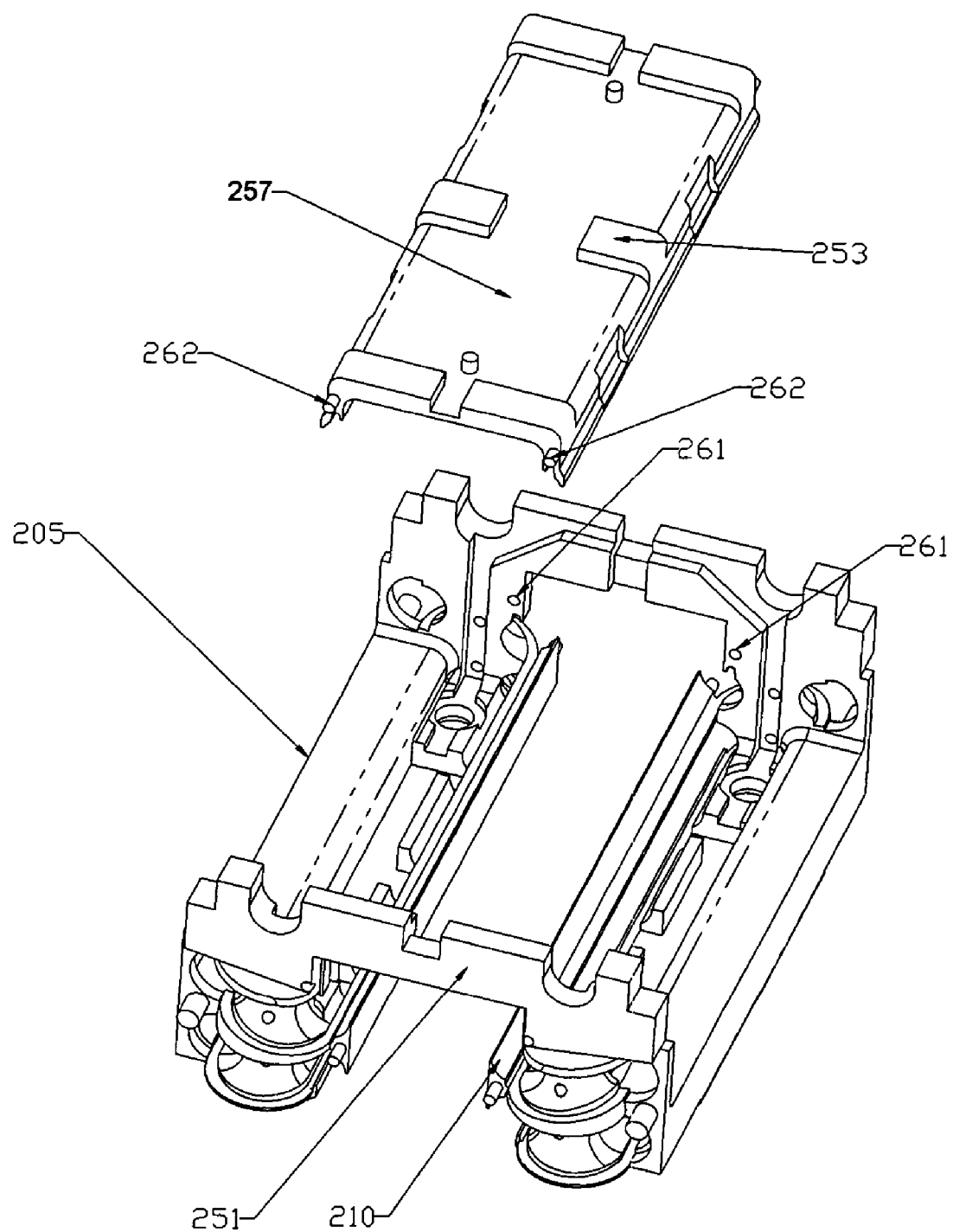
FIG. 8 is a perspective view of the second preferred embodiment of the present invention.

Referring to FIG. 8 for another preferred embodiment of the present invention, the bottom frame 205 is similar to that of the first preferred embodiment, whereas this preferred embodiment differs from the first preferred embodiment in the retaining strips 110 for the rolling elements, now labeled by 210 and formed directly on two end plates through injection-molding. While the upper plate 53 now labeled by 253 and the bottom frame 05 now labeled by 205 are separate formed by injection-molding. The concavity 257 on the upper plate 253 contains a lubrication pad 71 situated and are together mounted underneath the flat plate 31 of the rigid body. Thereafter the bottom frame 205 is mounted underneath the leg portions 32 of slide member 02 and integrated with the upper plate 253, which is positioned by the engagement of the positioning pin 262 on the upper plate 253 and the positioning hole 262 on the endplate 251 of the bottom frame 205.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A linear guide device, comprising a rail, at least one slide member and a multiple rows of rolling elements;
    said slide member consisting of a rigid body, a bottom frame, a front and a rear end caps, said rigid body comprising a flat plate and two leg portions downwardly extended therefrom, each leg portion having raceways on an inward surface and a return channel either completely or partially exposed on outer sides of said raceways, said bottom frame being mounted under said rigid body, further comprising two end plates attached on both ends of said rigid body, two under plates underneath said leg portions and an upper plate underneath said flat plate; said under plates further providing a plurality of rest return channels; said both endplates further providing inner walls of the turnaround channels for each said raceways;
    said front and rear end caps, mounted on the outer end of said endplate, and providing the outer wall of a turnaround channels, whereby said turnaround channels connect said return channels and said raceways to form a plurality of recirculation passages;
    said rail having multiple rows of longitudinally extended raceways, which correspond to the raceways of said slide member one-to-one, when said slide member riding on the rail;
    said multiple rows of rolling elements rolling within the coupled raceways and circulating within said recirculation passage;
    wherein each said upper plate and under plates of said bottom frame having a concavity, obturated by associating underneath the rigid body, as a lubricant reservoir, each said lubricant reservoir having at least one lubrication pad filled inside and being brought into contact with adjacent said rolling elements through the openings of said lubricant reservoir extending to said raceways.

2. The linear guide device of claim 1 wherein a plurality of recesses are formed on the inward surface of said flat plate, obturated by said upper plate associated underneath.

3. The linear guide device of claim 1 wherein said flat plate, said upper plate and said end plates form an integral body.

4. The linear guide device of claim 3 wherein there are retain bars situated on an inward surface of said two leg portions of said rigid body and between two adjacent raceways; said retain bars are connected to said end caps and together with the fringe of said upper and said flat plates form a gap smaller than the size of said rolling elements.

5. The linear guide device of claim 1 wherein said endplates, said under plates of said bottom frame are formed integrally, the upper plate is connected by the engagement between a plurality of positioning pins on said upper plate and positioning holes on said endplates, so as to form an integral body.

6. The linear guide device of claim 5 wherein retain bars are connected on two end plates and integrally formed together with the bottom frame; a gap is thereafter formed between said retain bars and the fringe of said upper and said flat plates; said gap is small than the size of said rolling elements.

7. The linear guide device of claim 1 wherein said rolling elements are a plurality of balls.

8. The linear guide device of claim 1 wherein a left and a right outside surface of said rail and two opposed inward surface of said leg portions of said rigid body are each provided with two up and down, longitudinally arranged raceways, whereto the openings of the lubricant reservoirs with their lubricant pads on upper plate and on the under plates are stretched respectively.

9. A linear guide device, comprising a rail, at least one slide member and a multiple rows of rolling elements;
    said slide member consisting of at least a rigid body, a front and a rear end caps, and two reinforce plates;
    said rigid body comprising a flat plate and two leg portions downwardly extended therefrom; each leg portion having raceways on inward surface;
    said ridge body of said slide member further comprising a return channel on outer sides of each said raceways, and a convex half-round portion as an inner wall of turnaround channel connecting both ends of said raceways and return channel;
    said front and rear end caps, mounted on the outer end of said rigid body, providing the outer wall of said turnaround channels, whereby said turnaround channels connect said return channels and said raceways to form recirculation passages;

said rail having multiple rows of longitudinally extended raceways, which correspond to the raceways of said slide member one-to-one, when said slide member riding on the rail;

said multiple rows of rolling elements rolling within the coupled raceways and circulating within said recirculation passage;

wherein the two reinforce plates being attached on the outer ends of said two end caps;

wherein two extending plates are folded from the bottom portion of said reinforce plates and, across the bottom of said end cap, stretched to the said two leg portions of said rigid body; a plurality of fixing screws are applied longitudinally passing through the end caps to fix the reinforce plates on both ends of the rigid body and upwardly to fix the folded extending plate on the leg portions of the rigid body respectively.

10. The linear guide device of claim 9 wherein insertion sites on said reinforce plates where said screws are embedded are depressed so that heads of said screws will not exceed outer surfaces of said end caps.

11. The linear guide device of claim 9 wherein the reinforce plates have a similar shape of opening as a cross-section of the rail to keep a slight gap with the rail.

12. A linear guide device, comprising a rail, at least one slide member;

said slide member comprising lubricant reservoirs, which having lubrication pads inside and at least a passage to connect other lubricant reservoirs or a lubricant inlet, where a lubricant supply tube connecting another extending lubricant reservoir apart from the slide member is associated;

a lubricant supply string situated inside the passage or the supply tube, such is brought into contact with the lubrication pads of said lubricant reservoirs and the lubricant inside the extending lubricant reservoir;

wherein said lubricant supply string comprises a plastic flexible string and a lubricant-transporting portion attached on said string which possesses the capillary capability.

13. The linear guide device of claim 12 wherein said lubricant-transporting portion is made of fiber, felt or flock which is perpendicularly attached on said plastic flexible string by electrostatic adhesion.

14. The linear guide device of claim 12 wherein said lubricant-transporting portion is made of floss and rewind on said plastic flexible string.

* * * * *